J. W. ALEXANDER.
MACHINE FOR MAKING CEMENT ROOFING TILE.
APPLICATION FILED AUG. 4, 1921.

1,428,351.

Patented Sept. 5, 1922.
5 SHEETS—SHEET 1.

Inventor
Jesse W. Alexander

Witness
J. R. Hoge

By H. B. Wilson & Co.
Attorneys

J. W. ALEXANDER.
MACHINE FOR MAKING CEMENT ROOFING TILE.
APPLICATION FILED AUG. 4, 1921.
1,428,351.
Patented Sept. 5, 1922.
5 SHEETS—SHEET 2.
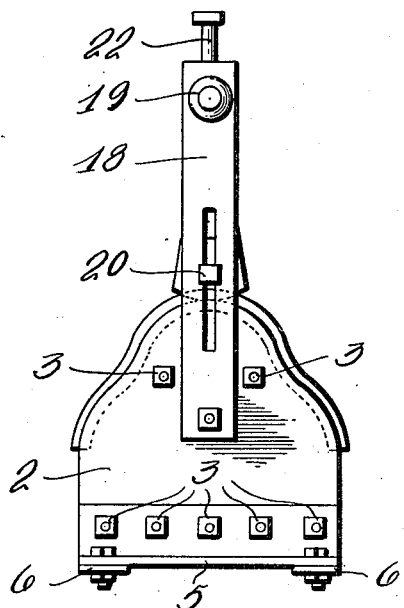
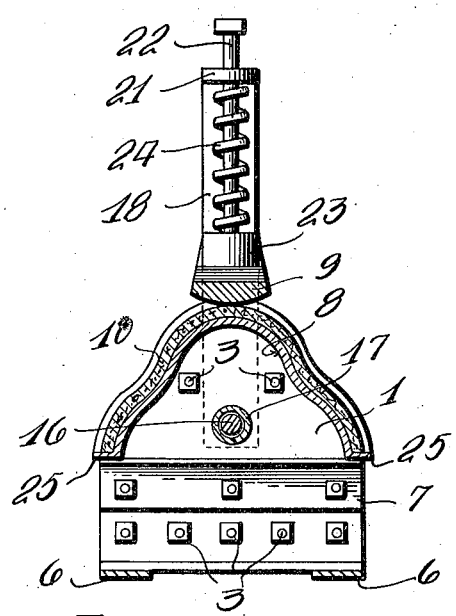
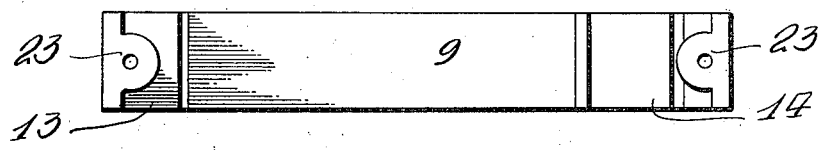
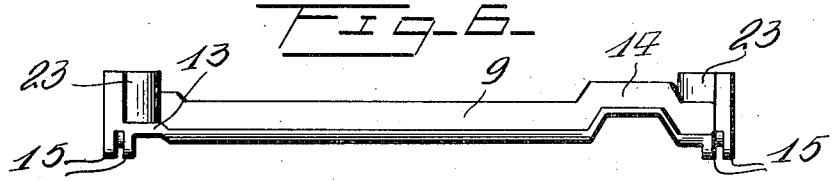
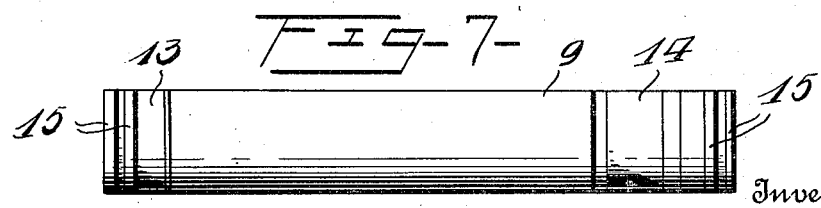
Inventor
Jesse W. Alexander
Witness
J. R. Hoge
By H. B. Willson & Co.
Attorneys

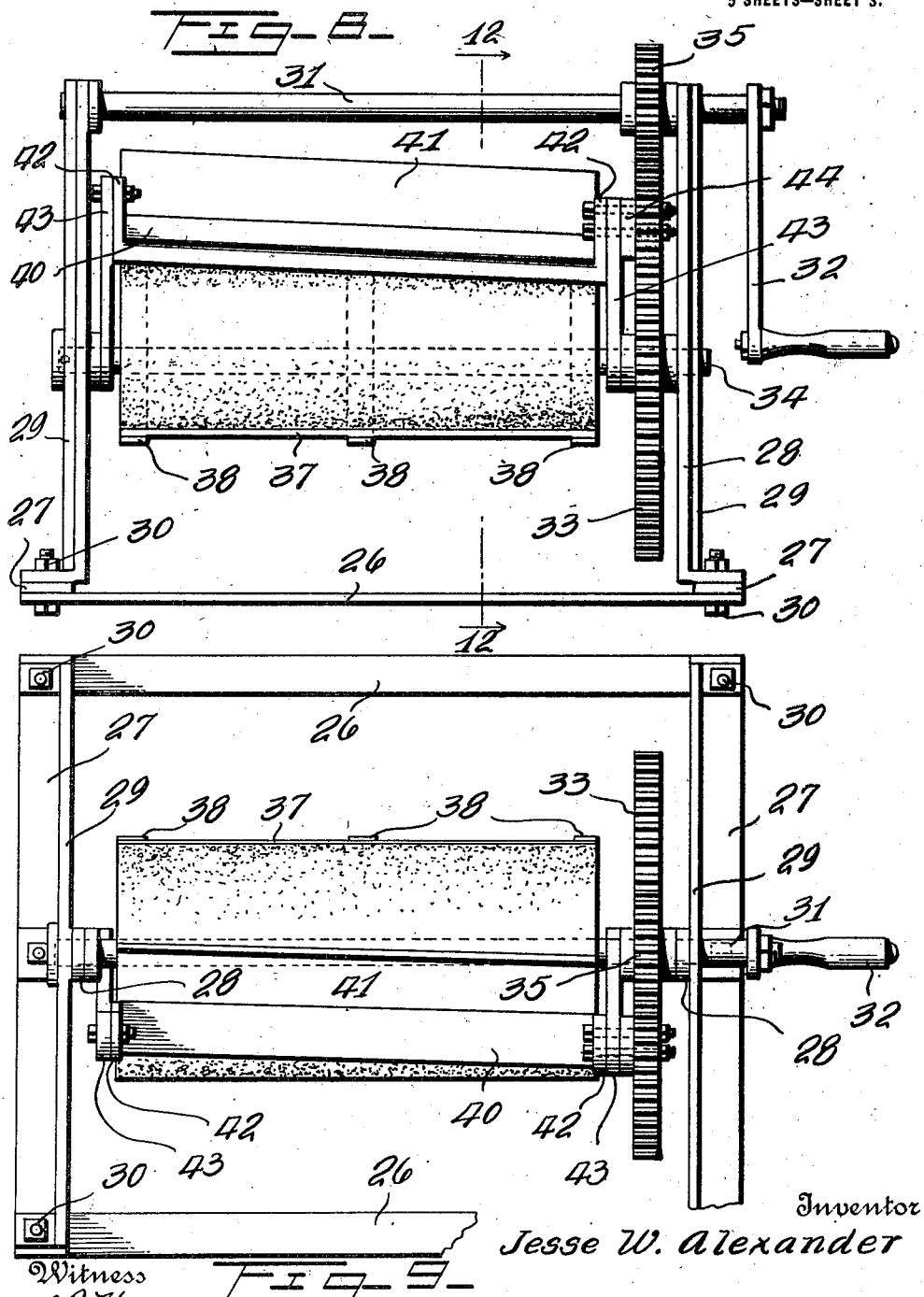

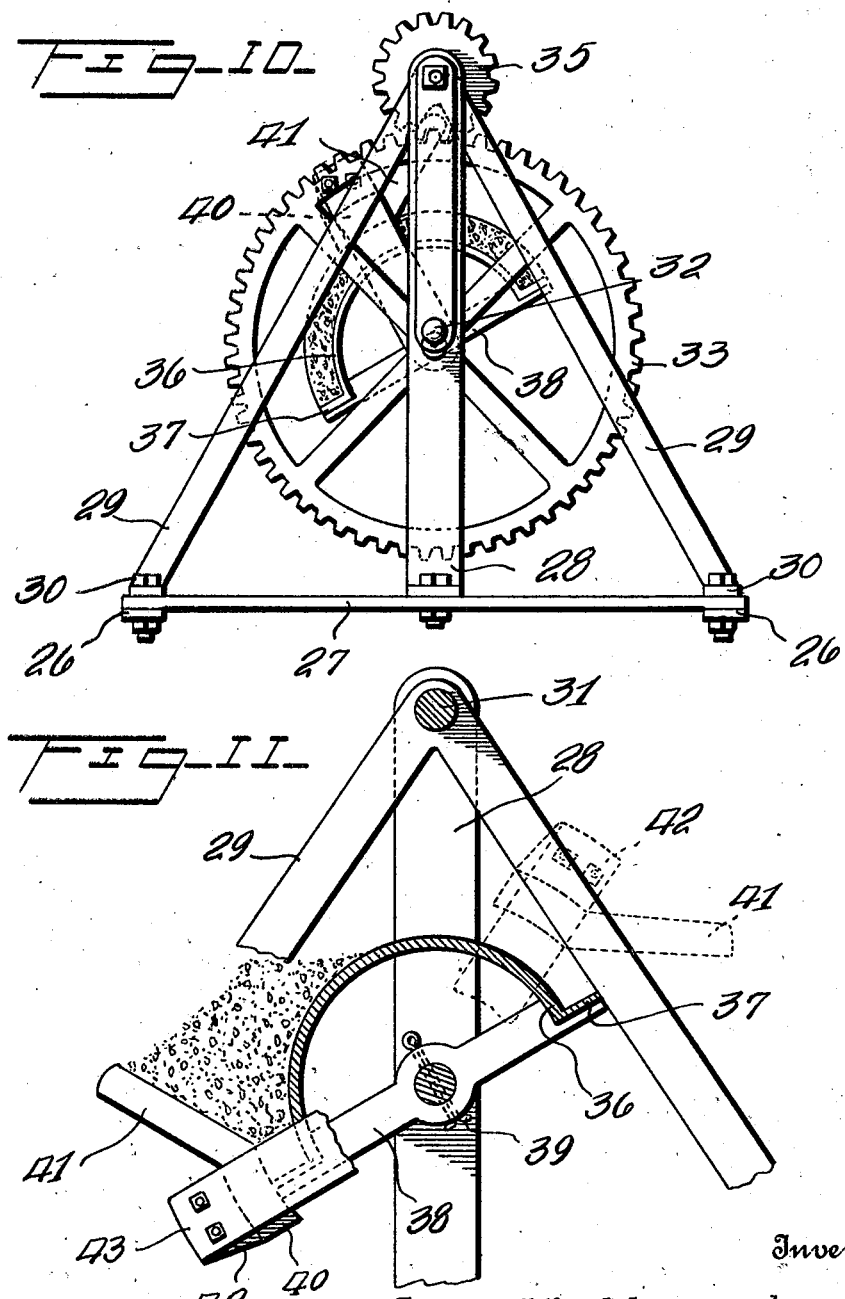

J. W. ALEXANDER.
MACHINE FOR MAKING CEMENT ROOFING TILE.
APPLICATION FILED AUG. 4, 1921.
1,428,351. Patented Sept. 5, 1922.
5 SHEETS—SHEET 5.
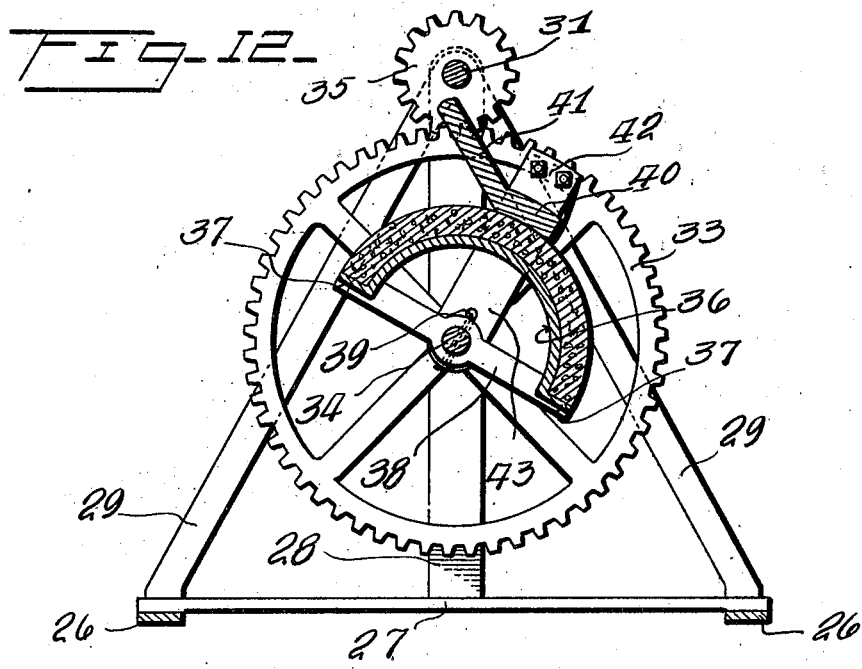
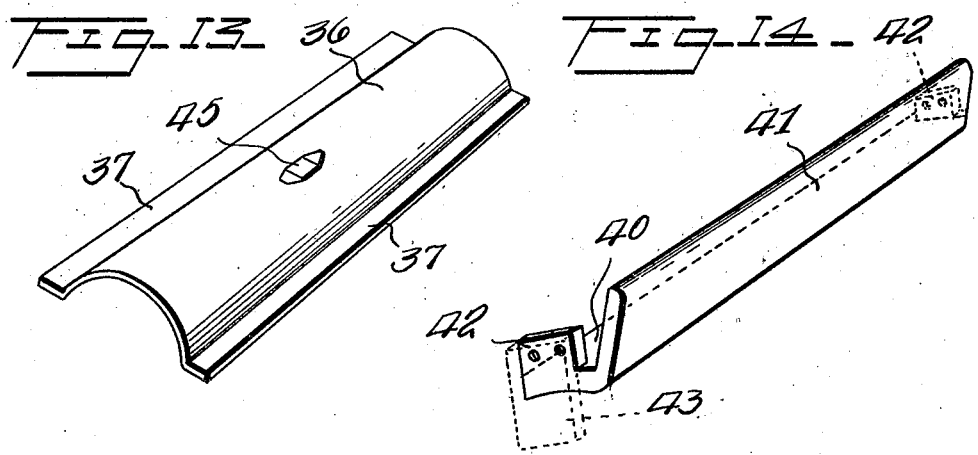
Inventor
Jesse W. Alexander Patented Sept. 5, 1922.

1,428,351

UNITED STATES PATENT OFFICE.

JESSE WILSON ALEXANDER, OF BIRMINGHAM, ALABAMA.

MACHINE FOR MAKING CEMENT ROOFING TILE.

Application filed August 4, 1921. Serial No. 489,749.

*To all whom it may concern:*

Be it known that I, JESSE W. ALEXANDER, a citizen of the United States, residing at Birmingham, in the county of Jefferson and State of Alabama, have invented certain new and useful Improvements in Machines for Making Cement Roofing Tile; and I do declare the following to be a full, clear, and exact description of the invention, such as will enable others skilled in the art to which it appertains to make and use the same.

This invention relates to an improved machine for making cement roof tile and one object of the invention is to provide a machine in which cement may be molded to the shape of a roof tile and not only molded at a desired thickness but smooth and thus caused to form a tile which will be provided with a smooth finish.

Another object of the invention is to provide a machine in which the cement may be packed tightly between the forming board or palette and smoothing bar or strip and the smoothing strip or bar thus permitted to serve as means for holding the cement in place while it is being packed as well as serving as means for smoothing the outer face of the cement.

Another object of the invention is to provide improved means for mounting the smoothing bar so that it will swing in the arc of a circle and thus permit the forming of a roof tile which will be curved transversely.

Another object of the invention is to provide a machine in which the smoothing bar may be yieldably held in engagement with a track carried by the machine and thus permit of the forming of a tile having an irregular curve when viewed in end elevation.

Another object of the invention is to provide a tile forming machine which can be easily operated and in which the tiles can be quickly formed.

This invention is illustrated in the accompanying drawings, wherein:

Figure 3 is a view showing the tile forming machine in end elevation.

Figure 4 is a transverse sectional view taken through the tile forming machine.

Figure 5 is a view showing the smoothing bar in top plan.

Figure 6 is a side elevation of the smoothing bar.

Figure 7 is a bottom plan view of the smoothing bar.

Figure 8 is a view showing a modified form of the machine in side elevation.

Figure 9 is a view showing the machine of Fig. 8 in top plan.

Figure 10 is a view showing the modified form or machine in end elevation.

Figure 11 is a diagrammatic view showing the method of operating the modified form of machine.

Figure 12 is a transverse sectional view through the modified form of machine taken along the line 12—12 of Fig. 8.

Figure 13 is a perspective view of the mold board or palette used in connection with the modified form of machine.

Figure 14 is a perspective view of the smoothing bar used in connection with the modified form of machine.

Figure 15 is a perspective view of a tile formed with the modified form of machine.

Figure 1:
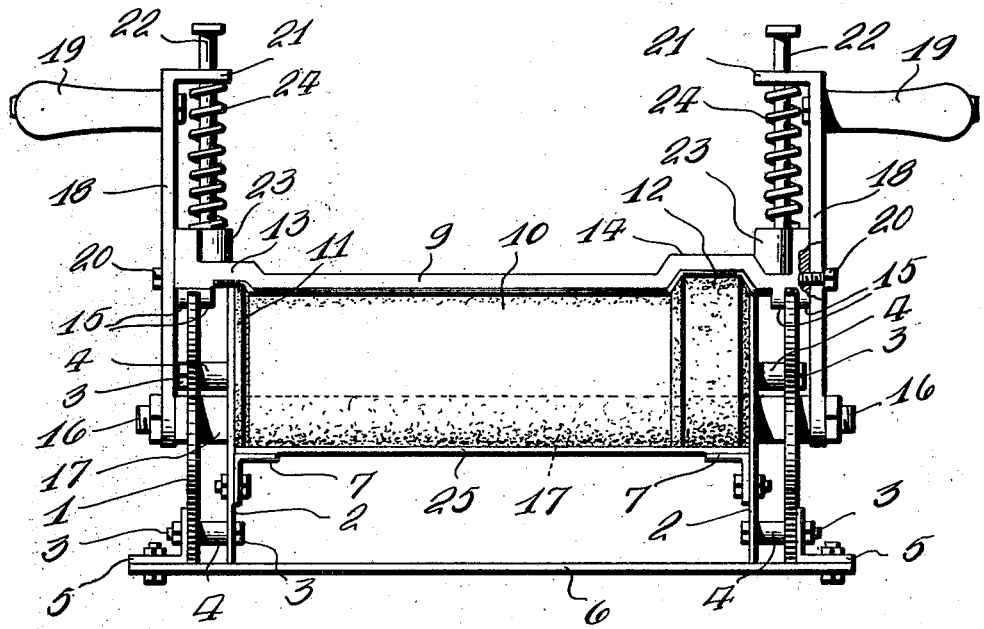
Figure 1 is a view showing a preferred form of tile forming machine in side elevation.
Figure 2:
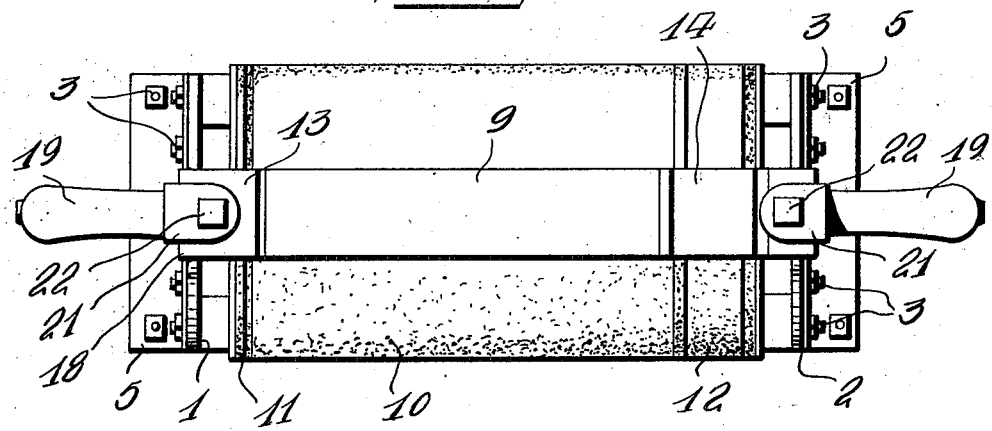
Figure 2 is a top plan view of the tile forming machine.

In the form of machine illustrated in Figs. 1 through 7 inclusive, the machine is provided with a frame which is provided with end plates 1 and 2, these plates being secured in spaced relation by securing bolts 3 upon which will be placed spacing sleeves 4. The lower securing bolts 3 also pass through angle strips 5 which are secured to the end portions of the longitudinally extending ground-engaging bars or strips 6. The inner end plates 2 carry angle strips 7 for extending beneath the end portions of the mold board or palette 8 and these plates 2 extend above the upper face of the mold board or palette 8 and will form end walls for the mold when the palette is in place. The end plates 2 can therefore be termed mold elements or plates to distinguish them from the plates 1 which will constitute tracks and may therefore be termed track elements. It should be noted that the palette 8 simply rests upon the strips 7 and therefore can be easily removed when desired.

The smoothing strip or bar 9 extends longitudinally of the palette or mold board 8 and is provided with a transversely curved under face as shown in Fig. 4 so that the smoothing bar or strip can move easily across the cement. In the form illustrated, it is desired to provide a tile 10 having thickened end portions 11 and 12 and therefore the smoothing bar or strip 9 is provided adjacent one end with an offset portion 13 and adjacent its other end with a larger offset portion 14. The smoothing bar is provided upon its underface with spaced strips 15 between which the track plates 1 will fit and the smoothing strip can thus have movement transversely of the palette board but will be held against movement longitudinally of the palette board. A shaft 16 is journalled in a pipe 17 which extends longitudinally beneath the mold board or palette and has its end portions passing through openings formed in the plates 1 and 2. Rocker bars 18 are carried by the end portions of this shaft 16 and are provided with handles 19 so that the rocker bars can be easily moved. The rocker bars are connected with the ends of the smoothing bar or strip by securing bolts 20 which extends through longitudinally extending slots formed in the rocker bars and these rocker bars are provided with inwardly extending bearing arms 21 through which slidably pass pins 22. These pins 22 which are in the form of bolts are screwed into threaded openings formed in the thickened portions or blocks 23 which extend upwardly from the end portions of the smoothing strip and springs 24 are placed about these bolts or pins 22 and through engagement with the arms 21 and blocks 23, will serve to yieldably hold the end portions of the smoothing strip in engagement with the track plates 1. The smoothing strip will thus follow the curvature of the track plates and since the curvature of the upper edges of these track plates conform to the transverse curvature of the palette board as shown in Fig. 4, the tiles formed with this machine will have an even thickness.

When this machine is in use the palette board is put in place and the handles 19 and the rocker bars swung downwardly so that the smoothing strip will have its underface engaging the outer edge of one of the flanges 25 which extend from the side edges of the palette board. The cement is then poured between the smoothing strip and palette board and after being tamped, the handles 19 will be grasped and the rocker bars moved to change the position of the smoothing strip. Additional cement can then be poured between the palette board and smoothing strip and tamped and the operation continued until the palette board has been completely covered with cement. If desired, the cement can be poured between the palette board and smoothing strip to such an extent that a surplus of cement will be provided and the rocker bars gradually moved and the pouring of cement and the tamping of the cement continued. It will thus be seen that with this method of operation, the smoothing strip will serve to carry the surplus cement and at the same time serve as a gauge to spread the cement evenly upon the palette board. After the board has been completely covered with the cement, the rocker bars or arms 18 can be swung back and forth a few times so that the smoothing strip will be moved across the surface of the cement and the surface of the cement well smoothed. By having the springs 24, the smoothing strip will be held in close contact with the track plates and can follow any irregular curves provided. After the cement has set sufficiently, the palette may be lifted from the supporting strips 7 and set aside for further drying of the cement and a new palette put in place.

In the form shown in Figs. 8 through 15, the machine is provided with a frame having its base provided with side bars or strips 26 and end bars or strips 27 which extend between and are connected with the ends of the side bars 26. Standards 28 extend upwardly from these cross strips 27 and serve as bracing and supporting means for the V-shaped yokes 29 which are secured by securing bolts 30, the bolts 30 serving to connect the strips 26 and 27 as well as serving to secure the yokes. A shaft 31 is journalled in openings formed in the supports 28 and yokes 29 and is provided with a turning handle 32 so that the shaft 31 may be easily rotated and rotary movement transmitted to the large gear 33 which fits loosely upon the shaft 34 and meshes with a small gear 35 rigidly mounted upon the shaft 31. A palette board 36 extends longitudinally of the shaft 34 and is provided with side flanges 37 which are secured to the end portions of the supporting arms or bars 38. These supporting arms or bars 38 fit upon the shaft 34 and are rigidly connected therewith by securing devices such as the keys 39 which pass through the arms and shaft. A smoothing strip 40 extends longitudinally of the palette board 36 and is provided with a lip 41 to provide means for carrying surplus cement. This smoothing strip is also provided with end tongues 42 having openings formed therein to receive fasteners connecting the smoothing strip with arms 43 which are loosely mounted upon the shaft 34. The fasteners which connect the smoothing strip with one of these arms 43 extend through a block 44 and through the large gear 33 and it will thus be seen that when the gear 33 is rotating, the smoothing strip will move in a circular path and will thus have movement parallel to the transverse surface of the palette board.

When this form of machine is in use, the smoothing board will be set with one of the flanges 37 engaging the inner or lower face of the smoothing board at the inner end of the lip 41. The cement can then be poured between the palette board and smoothing strip or bar 40 and the surplus cement will be carried by the outstanding lip 41. The shaft 31 can then be rotated to move the smoothing bar or strip toward the right in Fig. 11 and as the smoothing strip moves toward the right, the cement will be tamped and thus closely packed in the space between the palette board and smoothing bar. The palette board will thus be covered evenly with cement to an extent corresponding to the width of the flanges 37 and after the palette board has been completely covered, the rotation of the shaft 31 may be continued until the gear 33 has been rotated several times. After the gear has been rotated several times, the outer face of the cement will be well smoothed and the tile should be then provided with a good face when the cement has dried. By providing the palette board with a depression or pocket 45, a tongue can be formed upon the inner face of the tile 46 and thus an anchor provided which may be made use of to anchor the tiles in place upon a roof. It will thus be seen that there has been provided a tile forming machine in which the cement may be poured onto a palette board between the palette board and a smoothing bar and the cement tamped so that the space will be completely filled and a compact tile formed. It will be further noted that a relatively large quantity of cement may be poured onto the palette or mold board at a time and that the surplus cement will be carried across the palette board by the smoothing bar or strip. It will be further noted that with this machine, a substantially arcuate tile for roofing use can be easily and quickly formed and further that by means of this machine, the outer face of the tile can be properly smoothed and a good face provided and further that with this machine, a tile can be formed which will be of an even thickness.

I claim:

1. A cement tile mould comprising a frame including track means, a palette board carried by said frame, carrier means movable transversely of the palette board, and a cement gauging and smoothing strip carried by said carrier and resting upon said track means and extending longitudinally of the palette board in spaced relation to the same and movable towards and away from the palette board while moving transversely thereof.

2. The structure of claim 1 having the smoothing strip provided with guide means engaging said track elements to guide movement of the smoothing strip, and yieldable means holding the smoothing strip in engagement with said track elements.

3. The structure of claim 1 having the carrier means in the form of a shaft extending longitudinally beneath the palette board, arms carried by said shaft and having connection with the smoothing strip, and means for imparting swinging movement to said arms.

4. The structure of claim 1 having the carrier means in the form of a shaft extending longitudinally beneath the palette board, arms carried by said shaft and having side arms at their upper ends, said arms being provided with longitudinally extending slots, bolts carried by the smoothing strip and extending through the slot to slidably mount the smoothing strip, guide pins carried by said smoothing strip and extending through said side arms, springs upon said guide pins and yieldably holding the smoothing strip in engagement with the track elements, and operating handles carried by said arms.

5. The structure of claim 1 having the smoothing strip provided with a cement engaging face having one side portion extending in diverging relation to the upper face of the palette and providing a holder for surplus cement.

6. The structure of claim 1 having the smoothing strip provided with a cement engaging face curved transversely to provide side portions extending in diverging relation to the upper face of the palette.

7. A cement tile mould comprising a frame including inner and outer end plates, the outer end plates constituting track elements, supports carried by said inner end plates, a palette extending between the inner end plates and having side flanges resting upon said supports, the palette between the flanges being curved transversely, a rotatable shaft extending beneath the palette board and through the end plates, arms carried by the end portions of said shaft, a smoothing strip extending between said arms and longitudinally of said palette, means slidably connecting the smoothing strip with said arms, and yieldable means for holding the smoothing strip in engagement with the track elements.

8. The structure of claim 7 and ribs carried by the smoothing strip and positioned upon opposite sides of the track elements to hold the palette board against longitudinal movement.

In testimony whereof I have hereunto set my hand.

JESSE WILSON ALEXANDER.